(12) United States Patent
Wunderer

(10) Patent No.: US 6,496,251 B1
(45) Date of Patent: Dec. 17, 2002

(54) APPARATUS FOR DETECTING PROPERTIES OF SHEET MATERIAL

(75) Inventor: Bernd Wunderer, München (DE)

(73) Assignee: Giesecke & Devrient GmbH, Munich (DE)

(*) Notice: Subject to any disclaimer, the term of this patent is extended or adjusted under 35 U.S.C. 154(b) by 0 days.

(21) Appl. No.: 09/403,750
(22) PCT Filed: Apr. 29, 1998
(86) PCT No.: PCT/EP98/02539
§ 371 (c)(1),
(2), (4) Date: Feb. 11, 2000
(87) PCT Pub. No.: WO98/49651
PCT Pub. Date: Nov. 5, 1998

(30) Foreign Application Priority Data

Apr. 29, 1997 (DE) .......................... 197 18 122

(51) Int. Cl.⁷ ................................. G06K 9/74
(52) U.S. Cl. ........................................ 356/71
(58) Field of Search .................. 356/71, 364, 369, 356/445; 250/548, 559.01, 559.02, 559.11

(56) References Cited

U.S. PATENT DOCUMENTS

| 4,004,152 A | * | 1/1977 | Obser et al. ............... 250/562 |
| 4,510,383 A | * | 4/1985 | Ruppender ................ 235/462 |
| 4,746,792 A | * | 5/1988 | Dil ............................. 250/231 |
| 4,765,742 A | * | 8/1988 | Davinson .................... 356/373 |
| 5,433,253 A | * | 7/1995 | Toda et al. .................... 139/1 |
| 5,473,426 A | * | 12/1995 | Hayano et al. ........... 356/237.1 |
| 5,748,305 A | * | 5/1998 | Shimono et al. ......... 356/237.1 |
| 5,864,145 A | * | 1/1999 | Krimermann et al. . 250/559.29 |
| 5,880,846 A | * | 3/1999 | Hasman et al. ............. 356/376 |

FOREIGN PATENT DOCUMENTS

GB 1601362 10/1981

* cited by examiner

Primary Examiner—Michael P. Stafira
(74) Attorney, Agent, or Firm—Bacon & Thomas, PLLC

(57) ABSTRACT

The apparatus has an imaging device which converts light emitted by an illuminating device into a substantially parallel light pencil which illuminates a line in a line plane parallel to the sheet material and falls in a first illumination plane at a fixed angle of incidence, the first illumination plane forming with the line plane a first illumination angle and intersecting the line plane along the line. Light reflected along the line in a first detection plane at a fixed angle of reflection is imaged onto a detecting device, the detection plane forming with the sheet material a first detection angle and intersecting the line plane along the line. The angle of incidence is selected equal to the angle of reflection, and the first illumination angle equal to the first detection angle. For derivation of the magnetic properties of the sheet material components, the illuminating device preferably emits polarized light, and light specularly reflected along the line is analyzed before the detecting device by means of a polarizer.

19 Claims, 12 Drawing Sheets

|  | Metallic | Hard-magnetic | Soft-magnetic |
|---|---|---|---|
| 30, 31 | 100% | 95% | 100% |
| 30 | 0% | 5% | 0% |
| 30, 32 | 15% | 20% | 10% | ary than the width of the sheet material perpendicular to the transport direction so that the total surface of the sheet material can be detected during transport.

APPARATUS FOR DETECTING PROPERTIES OF SHEET MATERIAL

BACKGROUND OF THE INVENTION

This invention relates to an apparatus for detecting properties of sheet material, such as bank notes or papers of value, by reflected light according to the preamble of the main claim.

EP-A 0 537 531, DE-A 38 15 375 and DE-A 195 32 877 disclose apparatuses wherein sheet material is transported along a transport direction past an illuminating device and a detecting device. The illuminating device illuminates the sheet material along a line perpendicular to the transport direction. Light reflected by the sheet material along the line is detected by a detecting device. The latter either contains a CCD array or a photodiode array, the design and arrangement of which determine the local resolution of the reflected light along the line. The line is generally selected to be wider than the width of the sheet material perpendicular to the transport direction so that the total surface of the sheet material can be detected during transport.

The abovementioned apparatuses permit good detection specifically of diffusely reflected light. However, if the sheet material contains specularly reflecting components, such as metallic-luster security threads or printing inks or components incorporated in the sheet material or so-called OVDs, the latter cannot be distinguished from diffusely reflecting areas of the sheet material in all cases, in particular if their reflectivity is not very great.

U.S. Pat. No. 5,299,268 shows an apparatus like the above-described apparatuses wherein the sheet material is additionally illuminated along a second line perpendicular to the transport direction. The formation of suitable intensity ratios of the light intensities detected along the two lines permits detection of specularly reflecting components of the sheet material.

This apparatus is disadvantageous in that, firstly, relatively high equipment expense and, secondly, a relatively complicated evaluation method are necessary for detecting specularly reflecting components of the sheet material.

In addition, none of the apparatuses permits magnetic material properties of the sheet material components to be derived.

SUMMARY OF THE INVENTION

Briefly, in accordance with the invention, an apparatus is disclosed for detecting properties of sheet material along a line with specularly reflected light which is of simple construction and preferably also permits magnetic properties of the sheet material components to be derived.

This problem is solved according to the invention by the features stated in the main claim. Advantageous developments are the subject of the subclaims.

The basic idea of the invention is to provide an imaging device which converts light emitted by an illuminating device into a substantially parallel light pencil which illuminates a line in a line plane parallel to the sheet material and falls in a first illumination plane at a fixed angle of incidence, the first illumination plane forming with the line plane a first illumination angle and intersecting the line plane along the line. The imaging device is disposed as close to the line as possible. Light reflected along the line in a first detection plane at a fixed angle of reflection is imaged onto a detecting device, the detection plane forming with the sheet material a first detection angle and intersecting the line plane along the line. The angle of incidence is selected equals to the angle of reflection, and the first illumination angle equals to the first detection angle. For deriving magnetic properties of the sheet material components, the illuminating device preferably emits polarized light, and light specularly reflected along the line is analyzed by means of a polarizer before the detecting device.

An advantage of the inventive solution is that the apparatus is of simple construction and the intensities detected by the detecting device substantially contain only the fractions of specularly reflected light, so that one can do without an elaborate evaluation method for the detected intensities. The use of polarized light for illumination and suitable analysis of specularly reflected light by means of a polarizer additionally permits magnetic properties of the sheet material components to be derived.

For detection of specularly reflecting components of the sheet material and their magnetic properties, the sheet material is guided in the line plane so that light emitted by the illuminating device hits the sheet material directly and is reflected by the specularly reflecting components of the sheet material.

For detection of magnetic properties of non-specularly reflecting components, a reflector preferably having a high magnetic Kerr effect is provided in the line plane. Sheet material is guided past said reflector for detection so that the permanently magnetized magnetic components of the sheet material influence the Kerr effect of the reflector through magnetization thereof, which results in a change of light intensity reflected on the reflector.

In the following, various embodiments of the invention and the functional principles thereof will be described with reference to the figures, in which:

DETAILED DESCRIPTION OF THE PREFERRED EMBODIMENTS

Figure 1:
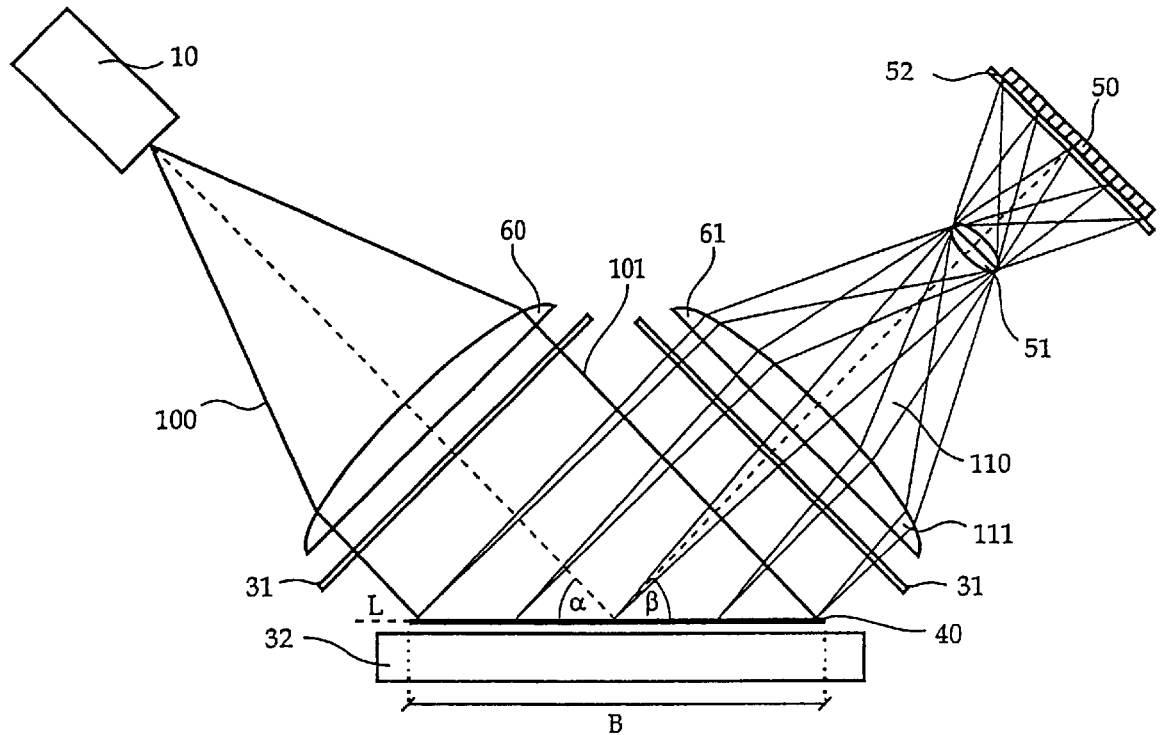
FIG. 1 shows a schematic diagram of a first embodiment of the invention.

FIG. 1 shows a schematic diagram of a first embodiment of the invention. Light 100 emitted by illuminating device 10 is converted by converting device 60 into substantially parallel light pencil 101 which falls at angle of incidence α on line L with a line plane parallel to sheet material 40 and illuminates it. Sheet material 40 is disposed here in the line plane so that light pencil 101 directly illuminates sheet material 40. Light 111 reflected along line L at fixed angle reflection β is imaged by means of a primary imaging device 61 and a secondary imaging device 51 onto detecting device 50. In this embodiment, illuminating device 10, primary imaging device 61 and detecting device 50 are disposed in a plane perpendicular to the line plane and intersecting the line plane along line L. For detection of specularly reflected light, angle of incidence is selected equal to angle of reflection β.

The length of line L is preferably selected greater than or equal to width B of sheet material 40. For detection of specularly reflected light, sheet material 40 is transported past illuminating device 10 of converting device 60 and detecting device 50 along a transport direction perpendicular to the plane in which the components are disposed. Accordingly, the total surface of sheet material 40 can be detected during transport.

Detecting device 50 preferably has a CCD array, which can be replaced by a photodiode array if required. The local resolution of reflected light along the line is determined by the number of pixels of detecting device 50 and the length of line L to be detected. For special applications it is also conceivable for the CCD or photodiode array to have only a single pixel.

Illuminating device 10 preferably emits polarized light, which can be produced for example by a laser diode or an incandescent lamp with a suitable polarizer. For determining magnetic material properties of the specularly reflecting components of sheet material 40 one can provide for example quarter-wave plates 31 and/or polarizers 52 in beam path 100, 101, 110, 111 between illuminating device 10 and detecting device 50. Additionally one can provide magnetic field producing device 32 which influences the magnetic properties of specularly reflecting components of sheet material 40 in suitable fashion. The functional principles of the apparatus for deriving the magnetic properties of specularly reflecting components of sheet material 40 will be dealt with in more detail in the following.

Figure 2A:
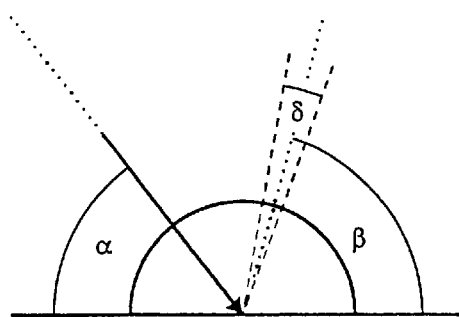
FIG. 2 shows schematic diagrams for different kinds of reflection of light.

FIG. 2 shows schematic diagrams of the various kinds of reflection of light. FIG. 2a shows the principle of diffuse reflection of light whereby light incident at angle of incidence α is reflected uniformly in all directions. If diffusely reflected light is detected at angle of reflection β, the intensity of detected light depends on range of angles of reflection δ which is detected by the detecting device. Incident intensity is generally much greater than detected intensity.

Figure 2B:
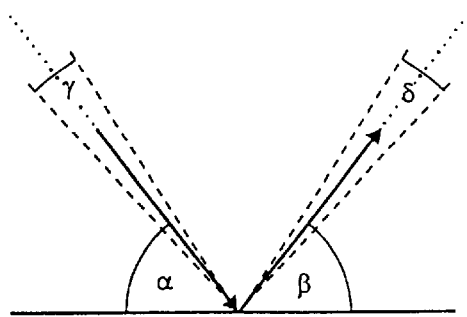

With the reflection shown in FIG. 2b light incident at angle of incidence α is reflected completely in the direction of angle of reflection β, angle of incidence α being equal to angle of reflection β. The intensity detected by the detecting device in angle range δ is substantially equal to the intensity of the incident light. This also holds if angle of incidence α of the incident light is varied in range of angles of incidence γ, said range γ being equal to range of angles of reflection δ. It results from this fact that the total intensity of reflected light pencil 111 is detected by detecting device 50 even if light pencil 101 is only a substantially parallel light pencil. Low tolerances in parallelism are compensated by range of angles of reflection δ during detection of reflected light pencil 111.

If angle range δ of detected light pencil 111 is selected to be relatively small, the intensity of diffusely reflected light becomes infinitely small compared to the intensity of specularly reflected light by reason of the abovementioned relations. Detecting device 50 thus detects substantially only the fractions of specularly reflected light.

Figure 3B:
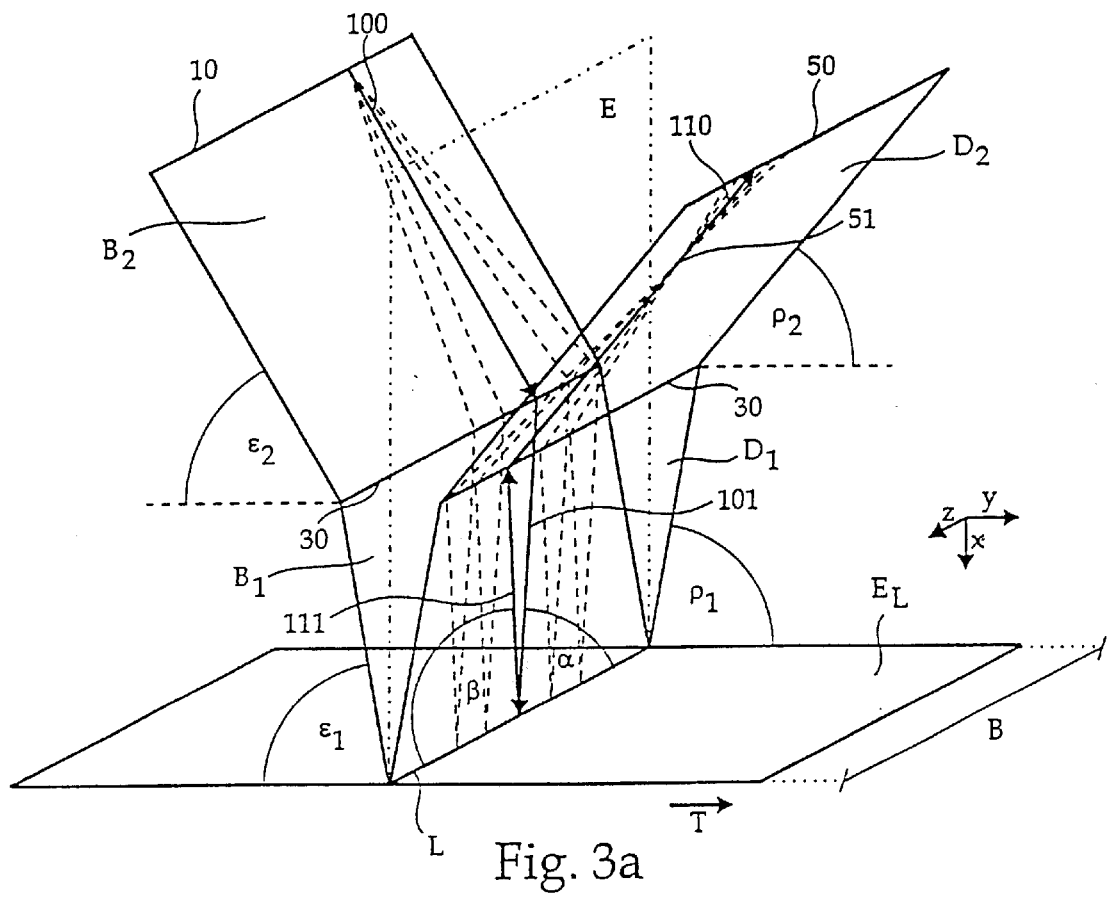
FIG. 3 shows a general schematic diagram of the arrangement of the individual components.
Figure 3B:
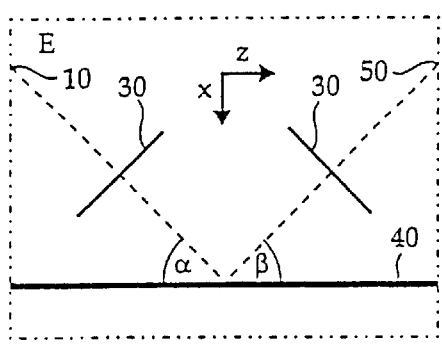

FIG. 3 shows a general schematic diagram of the arrangement of the individual components. For clarity's sake FIG. 3 shows illuminating device 10, imaging device 30, detecting device 50 and imaging device 51 only as lines or dots.

In this general case, light 100 emitted by illuminating device 10 is emitted into second illumination plane $B_2$ which forms with line plane $E_L$ second illumination angle $\epsilon_2$. Light 100 is deflected by imaging device 30 as light 101 into first illumination plane $B_1$ which forms with line plane $E_L$ first illumination angle $\epsilon_1$ and intersects line plane $E_L$ along line L. In first illumination plane $B_1$ line L is illuminated by parallel light pencil 101 at fixed angle of incidence α.

Light 111 reflected along line L in first detection plane $D_1$ at fixed angle of reflection β imaged onto detecting device 50, first detection plane $D_1$ forming with line plane $E_L$ first detection angle $\rho_1$ and intersecting line plane $E_L$ along line L. For imaging reflected light 111 onto detecting device 50, reflected light 111 is deflected by imaging device 30 as light 110 into second detection plane $D_2$ which forms with sheet material 40 second detection angle $\rho_2$.

For detection of specularly reflected light, angle of incidence α is selected equal to angle of reflection β, and first illumination angle $\epsilon_1$ equal to detection angle $\rho_1$. Second illumination angle $\epsilon_2$ and second detection angle $\rho_2$ can fundamentally be freely selected.

If required, for example due to a given spatial arrangement of illuminating device 10 or detecting device 50, one can provide one or more reflectors (not shown here) in beam path 100, 101, 111, 110 between illuminating device 10 and the detecting device for suitably deflecting light. Parts of illumination planes $B_1$, $B_2$ or detection planes $D_1$, $D_2$ thus change their position in space accordingly.

Figure 3C:
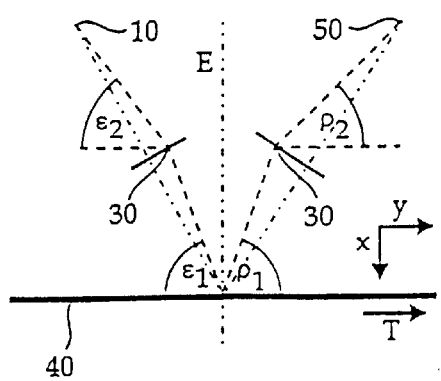

FIGS. 3b and 3c show the corresponding projections of FIG. 3a. Plane E depicted is perpendicular to line plane $E_L$ and intersects line plane $E_L$ along L.

Figure 4A:
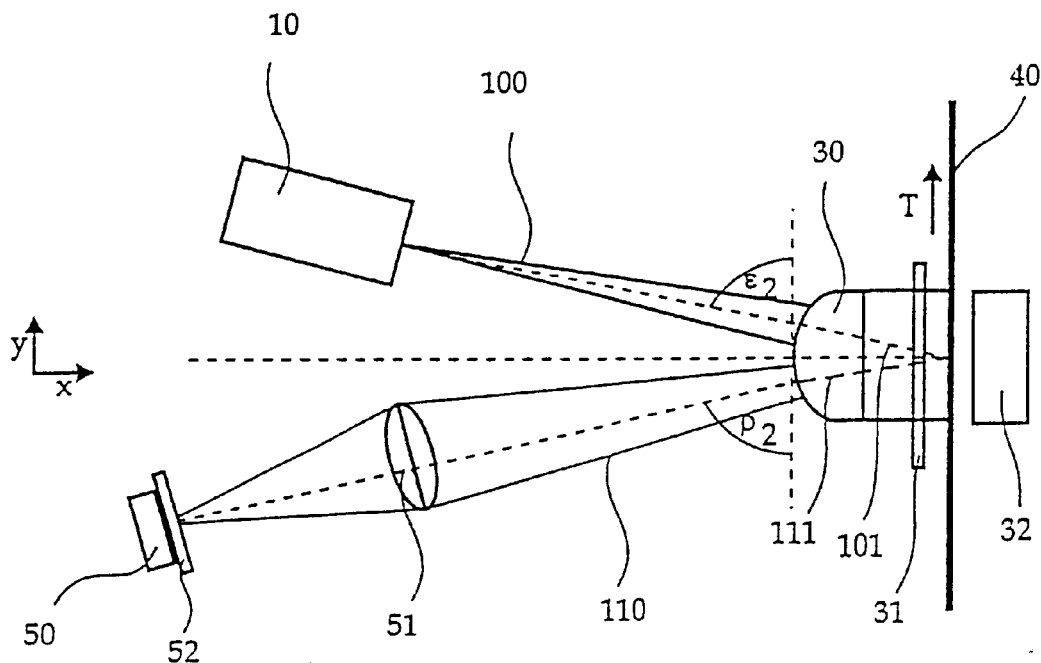
FIG. 4 shows a schematic diagram of a second embodiment of the invention.
Figure 4B:
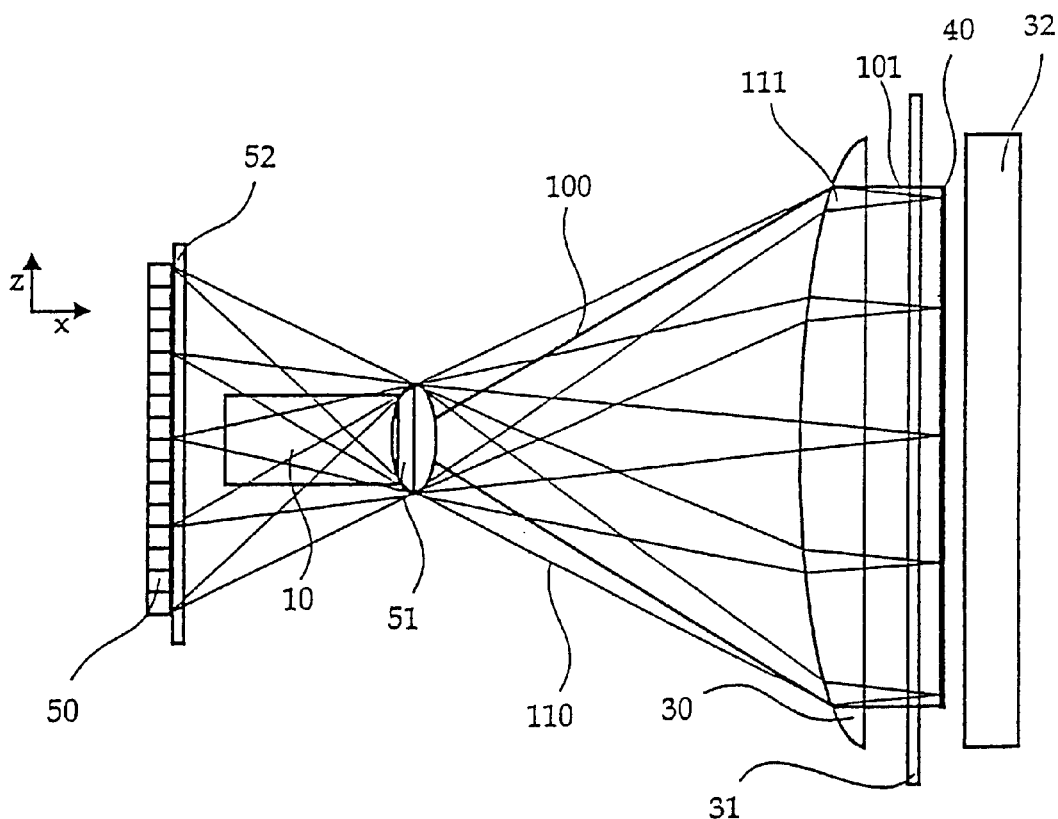

FIG. 4 shows a second embodiment of the invention wherein first illumination angle $\epsilon_1$ is equal to first detection angle $\rho_1$ and both are almost 90°. Angle of incidence α is selected equal to angle of reflection β equaling 90°. This arrangement permits imaging device 30 to be realized by a single component so that the apparatus is of even more simpler construction. Illuminating device 10 and imaging optic 51 are each located in the focal plane of imaging device 30. Emitted light 100 hits the imaging device above the center plane thereof. Reflected light 111 leaves imaging device 30 below the center plane as light 110 deflected by second detection angle $\rho_2$. In this embodiment, either second illumination angle $\epsilon_2$ or second detection angle $\rho_2$ can be selected freely. By reason of the optical properties of imaging device 30 second illumination angle $\epsilon_2$ is in any case equal to second detection angle $\rho_2$. Second illumination angle $\epsilon_2$ and second detection angle $\rho_2$ are shown relatively large in FIG. 4 for reasons of clarity. In practice, however, they are generally selected as small as possible. The deviations of first illumination angle $\epsilon_1$ and first detection angle $\rho_1$ from 90° are generally so low that they were neglected in the Figure.

A further advantage of this embodiment is that fluctuations of distance between imaging device 30 and sheet material 40 have virtually no effect on the intensity of detected light 110 by reason of the perpendicular incidence of light.

Figure 5A:
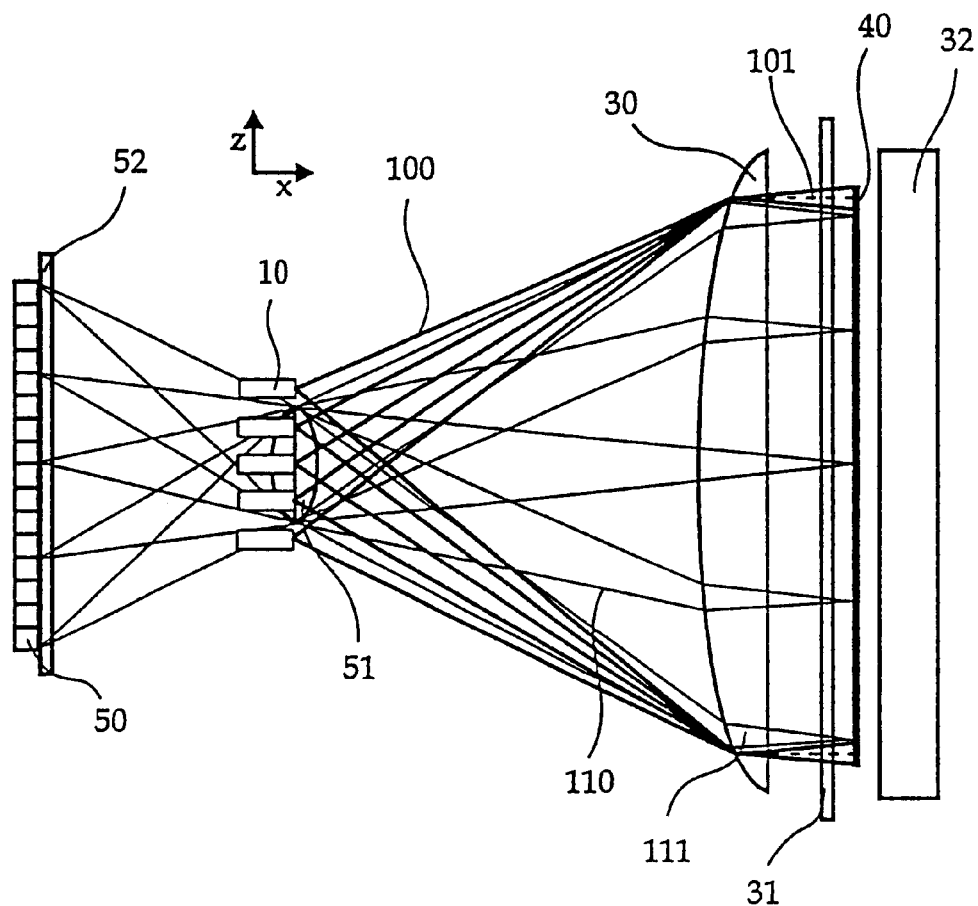
FIG. 5 shows a schematic diagram of a third embodiment of the invention.
Figure 5B:
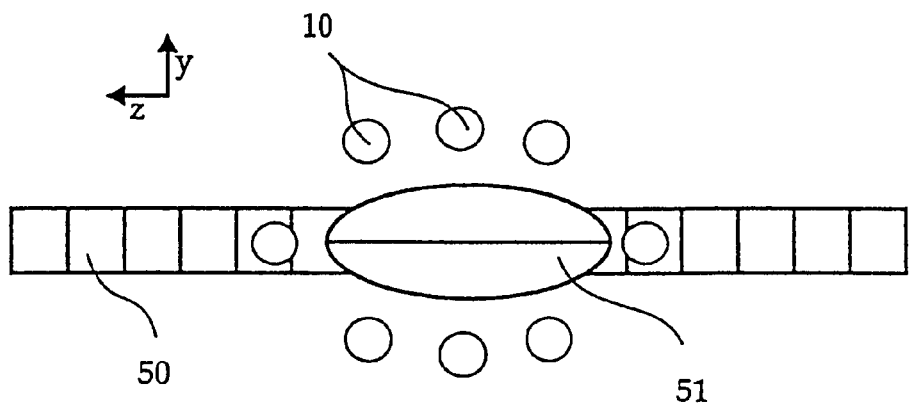

FIG. 5 shows a schematic diagram of a third embodiment of the invention which corresponds substantially to the second embodiment of the invention. In contrast to the second embodiment, second illumination angle $\epsilon_2$ is also selected equal to second detection angle $\rho_2$ equaling 90° here.

This arrangement involves the problem that illuminating device 10 and detecting device 50 at least seemingly lie on an axis perpendicular to sheet material 40. In order to avoid the resulting problems, such as shadowing of detecting device 50 by illuminating device 10, illuminating device 10 consists here of a number of illumination elements disposed in the area around imaging device 51. This arrangement of illuminating device 10 causes emitted light 100 to be converted by imaging device 30 only into a substantially parallel light pencil.

The arising deviations from parallelism of light pencil 101 are indicated in FIG. 5a. However they can be compensated, as explained above, by a corresponding choice of range of angles of reflection δ of detecting device 50. The occurrence of different directions in illuminating light pencil 101 furthermore has the advantage that variations of the position of the object arising from its tilt over the detection plane can likewise be compensated.

Figure 6:
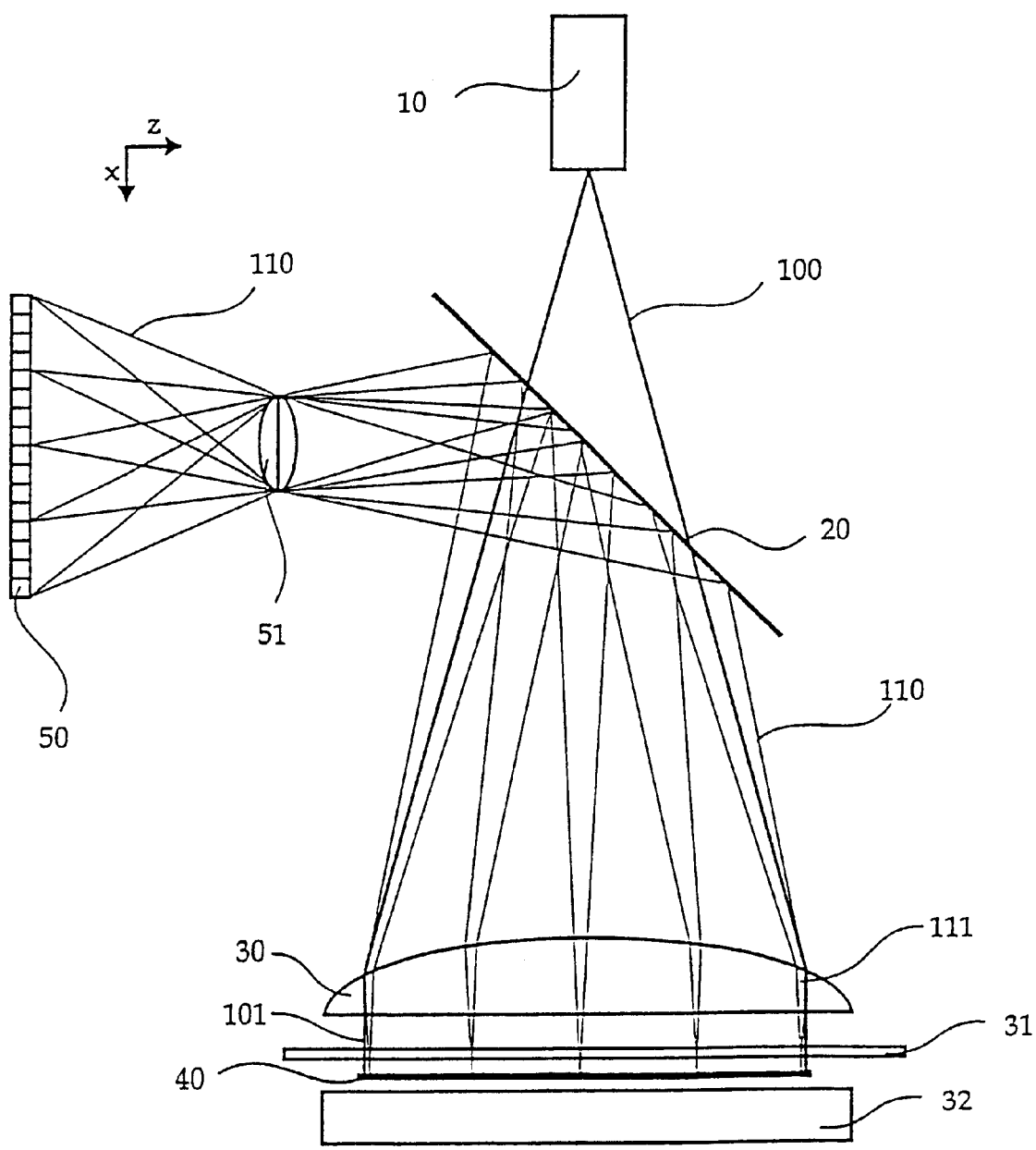
FIG. 6 shows a schematic diagram of a fourth embodiment of the invention.

FIG. 6 shows a schematic diagram of a fourth embodiment of the invention which corresponds substantially to the third embodiment. To avoid the above-described problem, beam splitter 20 is provided in beam path 100, 110 for transmitting at least part of light 100 emitted by illuminating device 10 and reflecting at least part of light 110 reflected by sheet material 40 in the direction of detecting device 50. Thus, undesirable shadowing can be avoided here too. If required, the positions of illuminating device 10 and detecting device 50 can also be interchanged.

In the following the functional principles of the invention will be explained with reference to FIGS. 7 to 11.

Figure 7:
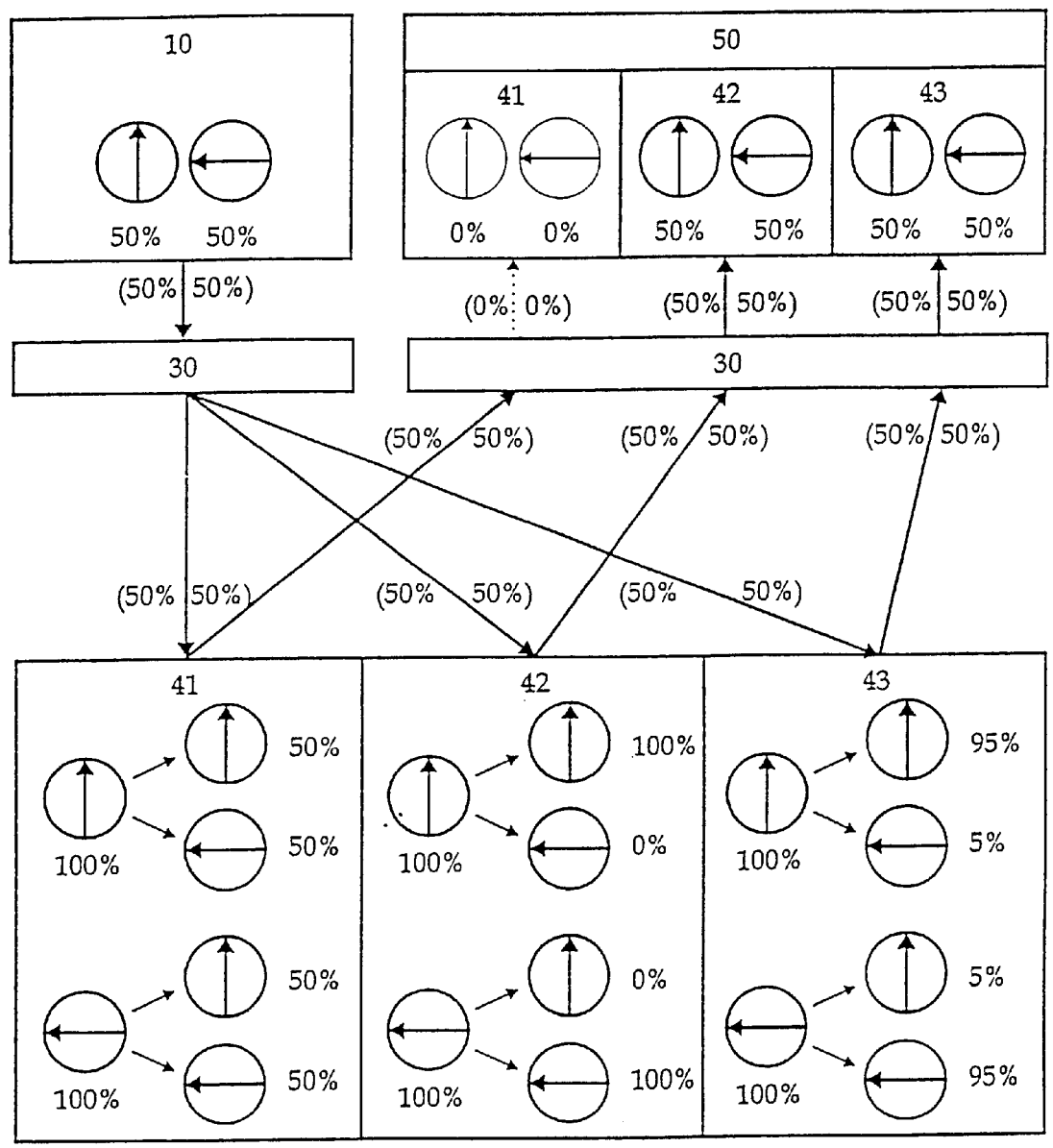
FIG. 7 shows the functional principle of the invention according to the first, second or third embodiment with unpolarized light.

FIG. 7 shows the functional principle of the invention according to the first, second or third embodiment, illuminating device 10 emitting unpolarized light composed of 50% vertical polarization and 50% horizontal polarization. Unpolarized light is imaged by imaging device 30 onto the sheet material and hits different areas there. Area 41 is a diffusely reflecting area. Area 42 represents a specularly reflecting metallic area, and area 43 a specularly reflecting magnetic area showing a magneto-optical Kerr effect.

Light hitting one of the areas consists of 50% vertically and 50% horizontally polarized light, as explained above. When impinging on diffusely reflecting area 41 the fraction of vertically polarized light is divided into 50% vertically polarized and 50% horizontally polarized light. This also applies analogously to impinging horizontally polarized light. Light reflected by such an area 41 thus again consists of 50% vertically and 50% horizontally polarized light.

In the case of specularly metallically reflecting area 42 polarization is retained both in vertically and in horizontally polarized light. Light reflected by area 42 is thus in turn composed of 50% vertically and 50% horizontally polarized light.

Specularly magnetically reflecting area 43 rotates the polarization direction of incident light by a given amount by reason of the Kerr effect for example. Vertically polarized light is thus reflected by area 43 substantially as vertically polarized light, here 95%, and reflected to a small extent, here 5%, as horizontally polarized light. This applies analogously to impinging horizontally polarized light. It results from corresponding summation of the fractions that light reflected by area 43 in turn contains 50% vertically and 50% horizontally polarized light.

The ratio between vertically and horizontally polarized reflected light from area 43 is greatly dependent on the magnetic properties of the components in sheet material 40. The stated fractions of 95% and 5% are freely selected here and intended only to illustrate the effects that occur.

Light reflected by areas 41 to 43 is then imaged by imaging device 30 onto detecting device 50. The inventive arrangement of components ensures that virtually no light diffusely reflected by area 41 is detected by detecting device 50. Light reflected by metallically specularly reflecting area 42 and by magnetically specularly reflecting area 43 is detected quasi completely as unpolarized light by detecting device 50.

Figure 8:
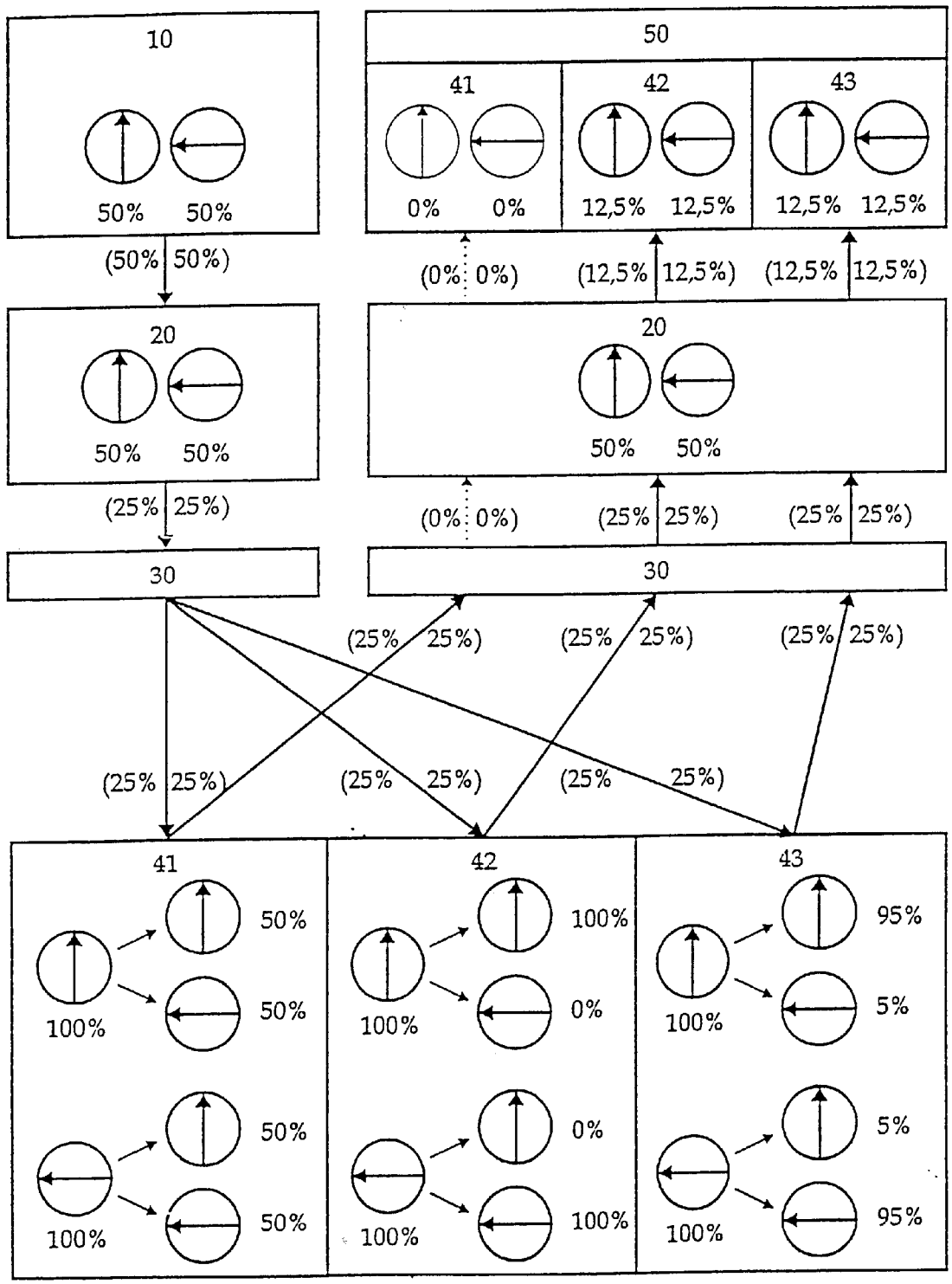
FIG. 8 shows the functional principle of the invention according to the fourth embodiment with unpolarized light.

FIG. 8 shows the functional principle of the invention according to the fourth embodiment. Here, too, illuminating device 10 emits unpolarized light. Light first hits beam splitter 20 which transmits 50% of the vertically and 50% of the horizontally polarized fractions of the light. These are then imaged by imaging device 30 onto areas 41 to 43 of sheet material 40. Reflection takes place here in accordance with the functional principle described for FIG. 7. Light reflected by areas 41 to 43 in turn reaches imaging device 30 which again images only light specularly reflected from areas 42 and 43 via beam splitter 20 onto detecting device 50. Beam splitter 20 reflects only 50% of the vertically or horizontally polarized fractions of the reflected light onto detecting device 50.

As with the functional principle according to FIG. 7, detecting device 50 again detects only light specularly reflected from areas 42 or 43. In contrast to the functional principle according to FIG. 7, however, only one fourth of the light intensity reaches detecting device 50.

Summing up, the first to fourth embodiments of the invention with illuminating device 10 with unpolarized light permit specularly reflecting components of sheet material 40 to be detected. However, one cannot derive magnetic properties of said components here. For simplicity's sake, any losses, for example through absorption and scatter on the various components of the apparatus, are generally disregarded.

In the following, three functional principles of the invention with polarized light which additionally permit derivation of magnetic properties of specularly reflecting components of the sheet material 40 will be explained with reference to FIGS. 9 to 11. With all these functional principles the illuminating device emits polarized light, which is to be 100% vertically polarized here by way of example to show the effects.

In the first to third embodiments, polarized light emitted by illuminating device 10 hits imaging device 30 directly. In the fourth embodiment, polarizing beam splitter 20 is provided which transmits vertically polarized light and reflects horizontally polarized light, so that vertically polarized light emitted by illuminating device 10 is transmitted completely by beam splitter 20 and reaches imaging device 30.

In the beam path of light reflected by sheet material 40 polarizer 52 transmitting only horizontally polarized light is provided between imaging device 30 and detecting device 50 in the first to third embodiments. In the fourth embodiment, only the horizontally polarized fraction of light reflected by sheet material 40 is reflected onto detecting device 50 by reason of polarizing beam splitter 20.

Figure 9:
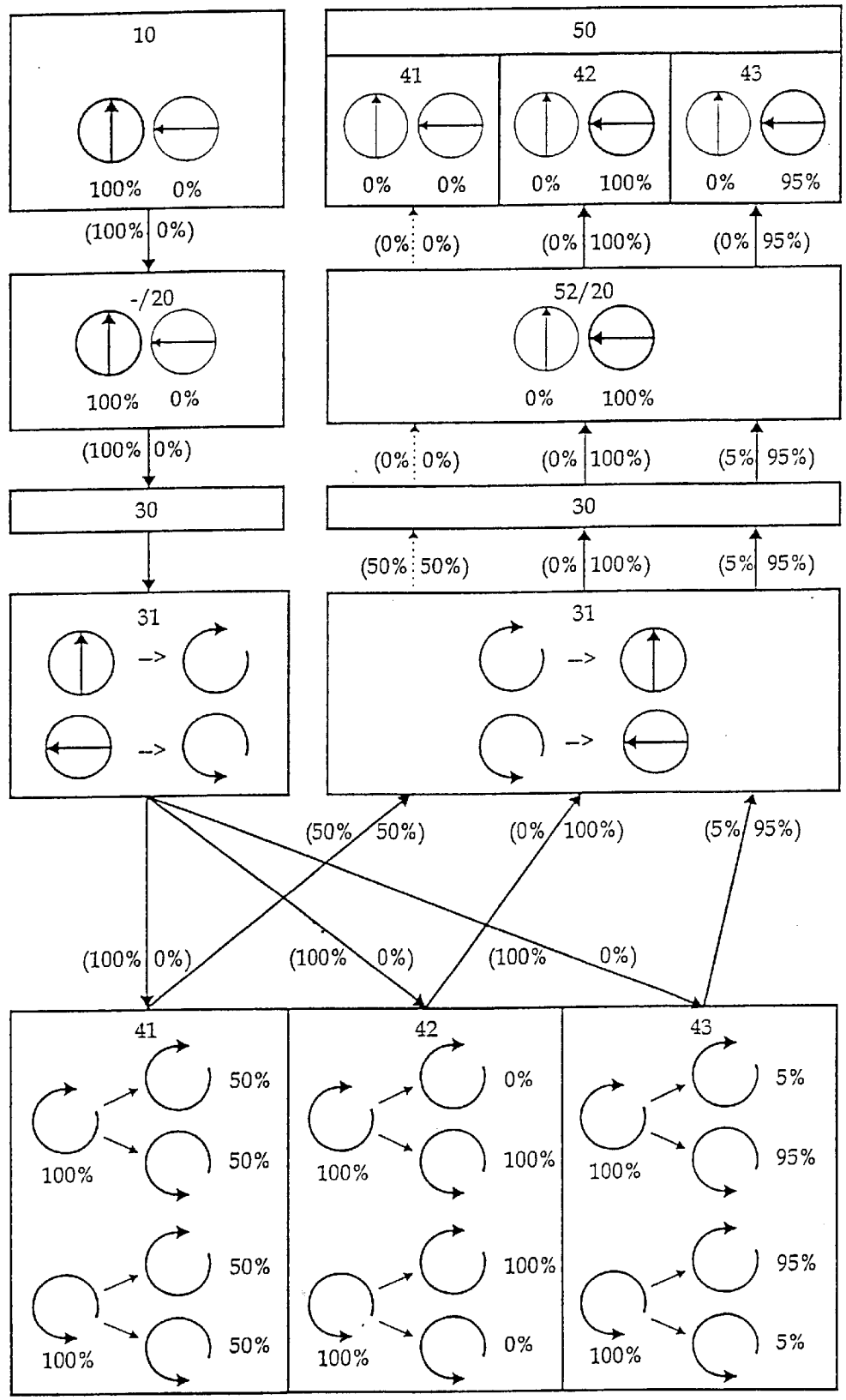
FIG. 9 shows a first functional principle of the invention with polarized light.

With the first functional principle according to FIG. 9 a quarter-wave plate is provided both in the beam path between imaging device 30 and sheet material 40 and in the beam path between sheet material 40 and imaging device 30 for converting e.g. vertically polarized light into right-handed circularly polarized light and horizontally polarized light into left-handed circularly polarized light or right-handed circularly polarized light into vertically polarized light and left-handed circularly polarized light into horizontally polarized light.

Upon reflection on diffusely reflecting area 41, impinging right-handed circularly polarized light is converted 50% into right-handed circularly polarized light and 50% into left-handed circularly polarized light. Upon reflection of right-handed circularly polarized light on specularly reflecting metallic area 42, right-handed circularly polarized light is converted completely into left-handed circularly polarized light. Upon reflection of right-handed circularly polarized light on specularly magnetically reflecting area 43, right-handed circularly polarized light is converted substantially, here 95%, into left-handed circularly polarized light and a small fraction, here 5%, is retained as right-handed circularly polarized light. When reflected light passes through quarter-wave plate 31 the circularly polarized fractions are converted back into linearly polarized fractions which are then analyzed by polarizer 32 or polarizing beam splitter 20, as described above.

With the first functional principle of the invention with polarized light, it thus results that no intensity from diffusely reflecting area 41 is detected on detector device 50. Intensity of light reflected on metallically reflecting area 42 is detected completely by detecting device 50, while intensity of light reflected on magnetically specularly reflecting area 43 is lower by a certain fraction, here 5%. Thus, one can distinguish metallically reflecting area 42 and magnetically reflecting area 43.

Figure 10:
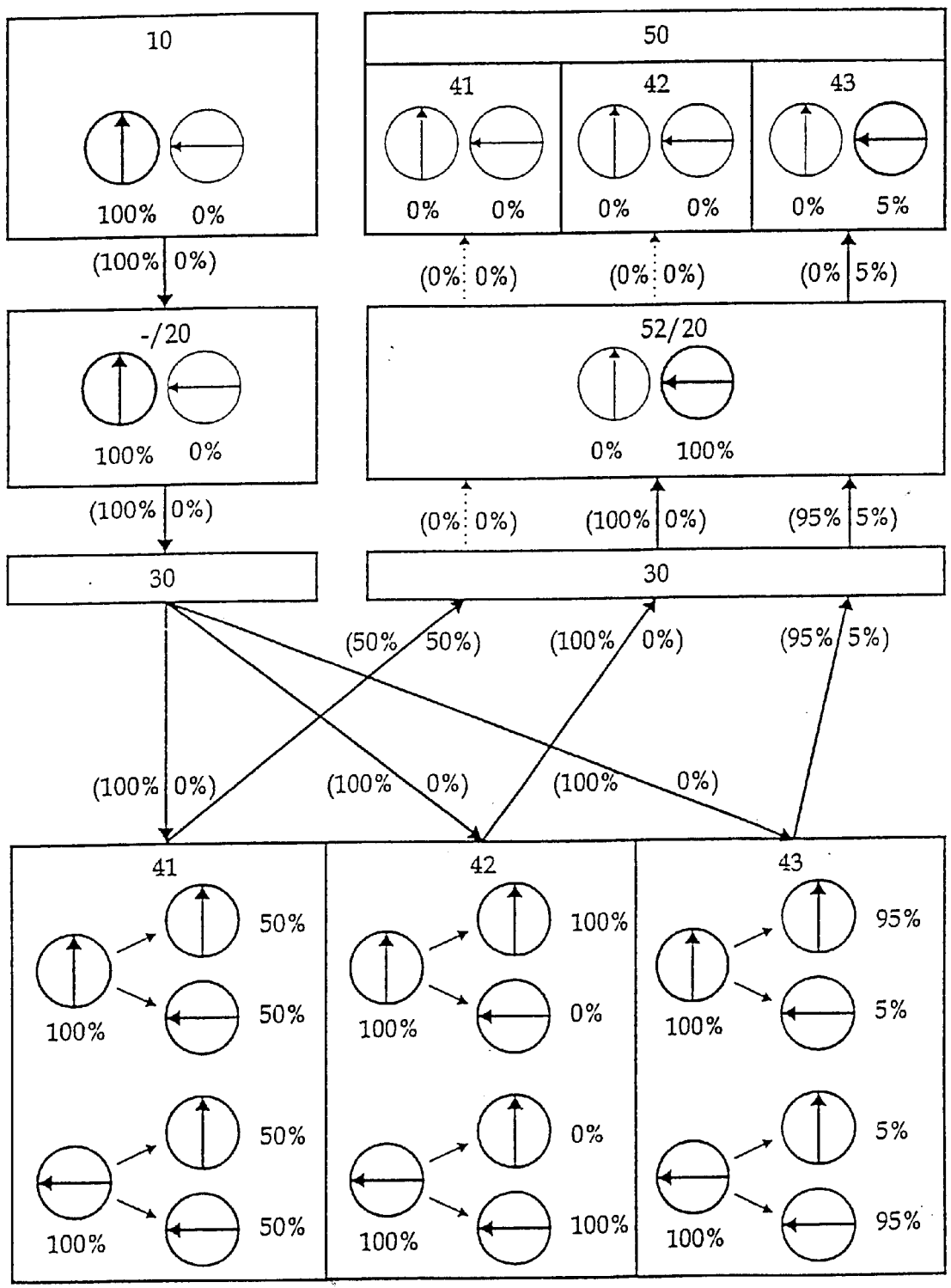
FIG. 10 shows a second functional principle of the invention with polarized light.

FIG. 10 shows a second functional principle of the invention with polarized light wherein quarter-wave plate 31 according to the first functional principle of the invention was omitted so that sheet material 40 is illuminated directly with vertically polarized light. Reflection on areas 41 to 43 takes place in the way stated above in connection with the functional principle according to FIG. 7. Through the additional analysis of reflected light by means of polarizer 52 or polarizing beam divider 20, no light reflected by areas 41 and 42 reaches detector 50. Only a fraction, here 5%, of light reflected by magnetically reflecting area 43 is detected by detecting device 50. The second functional principle of the invention with polarized light thus permits only magnetically reflecting areas 43 of sheet material 40 to be detected.

Figure 11:
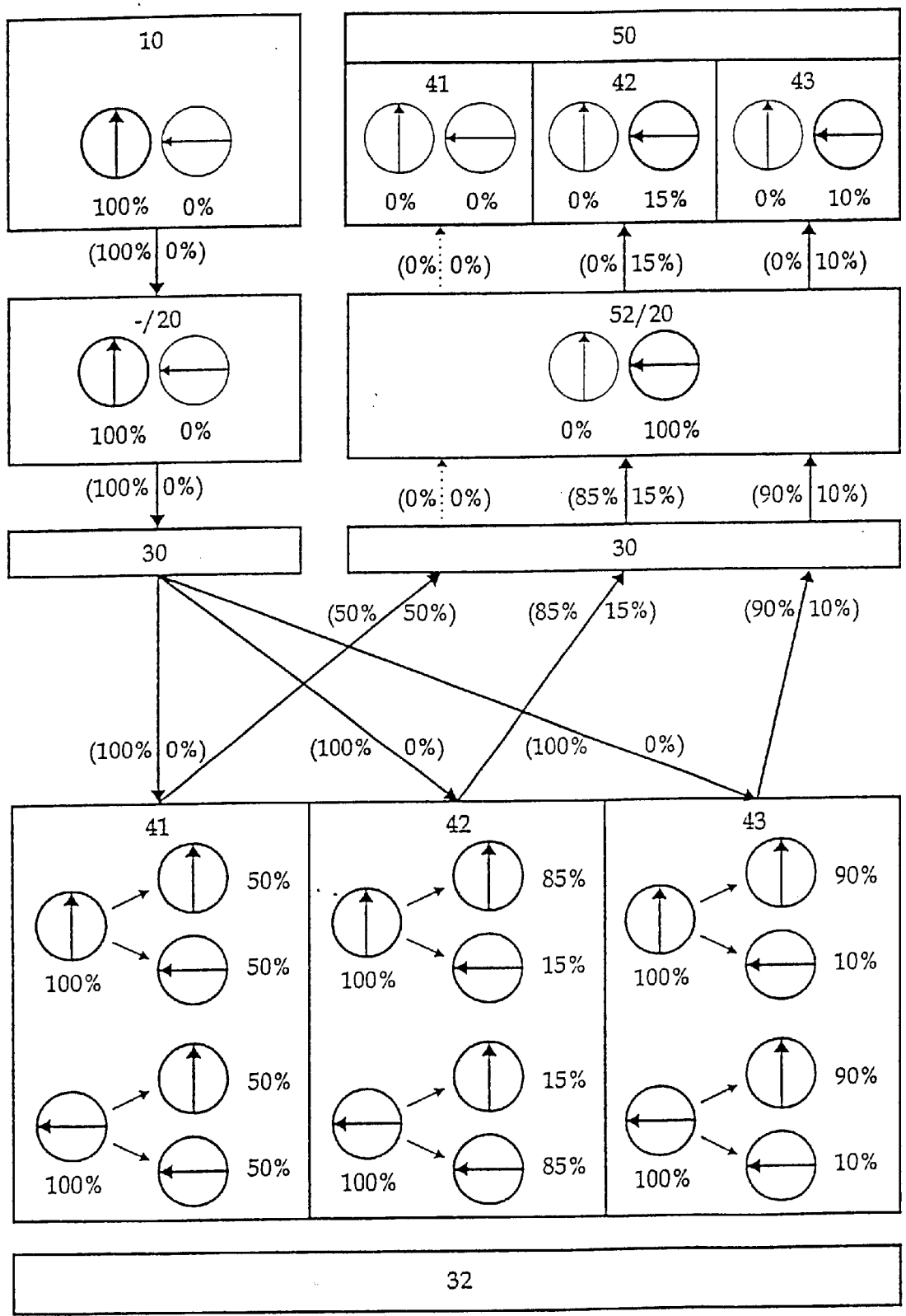
FIG. 11 shows a third functional principle of the invention with polarized light.

The third functional principle of the invention with polarized light is shown in FIG. 11 and corresponds substantially to the second functional principle of the invention with polarized light, with magnetic field producing device 32 additionally provided in the area of sheet material 40. The magnetic field produced by magnetic field producing device 32 is selected so great in this example that the polarization of light reflected by metallically reflecting area 42 is retained substantially, here 85%, and a small fraction, here 15%, converted to the other polarization direction.

If the magnetic components of area 43 are aligned by the magnetic field of magnetic field producing device 32, they are aligned in the opposite direction to the magnetic field of magnetic field producing device 32, so that this magnetic field and thus the rotation of the polarization plane are accordingly reduced. In this example the magnetic components of area 43 cause a reduction in the magnetic field of magnetic field producing device 32 so that the polarization of the fractions is retained substantially, here 90%. In case of a lower fraction, here 10%, the polarization of the light is changed.

As with all functional principles of the invention, no light reflected by diffusely reflecting area 41 is detected here either. Since the magnetic field of magnetic field producing device 32 was reduced by the magnetic components of sheet material 40 in magnetically reflecting area 43 of sheet material 40, the intensity of light from area 43 detected by detecting device 50, here 10%, is also lower than the intensity of that from metallically reflecting area 42, here 15%, so that one can derive a differentiation between metallically reflected and magnetically reflected light here, too.

Figures 12, 13:
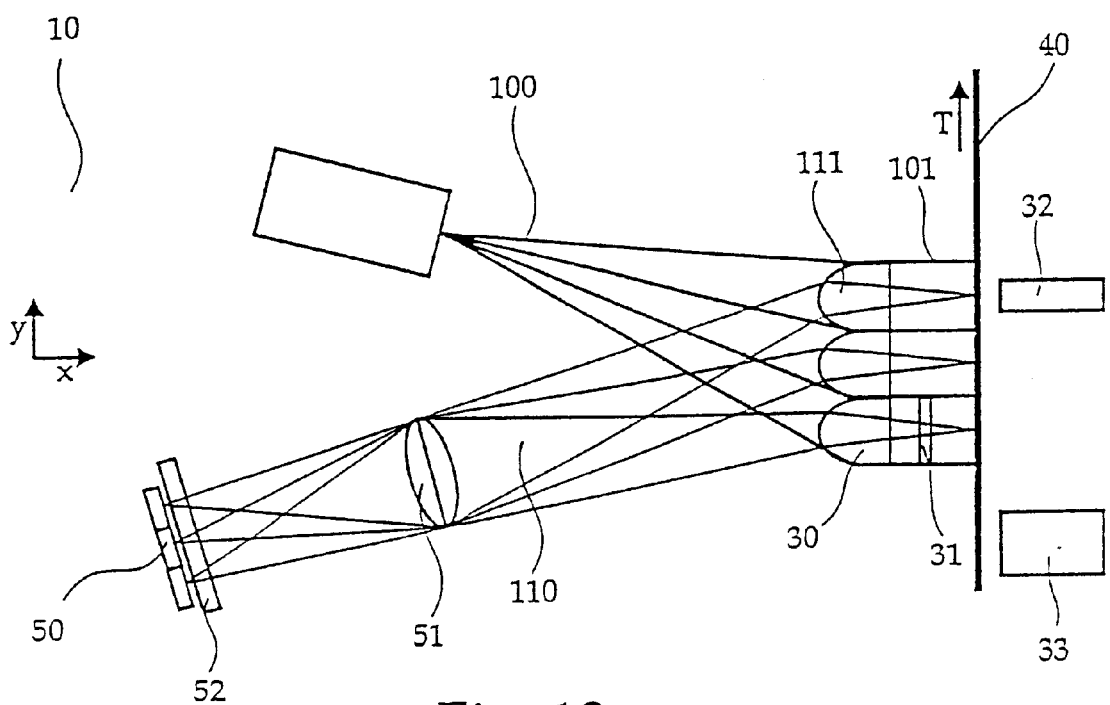
FIG. 12 shows a combination of a plurality of apparatuses according to the second embodiment with different functional principles with polarized light.
FIG. 13 shows a table for deriving magnetic properties of the specularly reflecting components of the sheet material.

FIG. 12 shows a combination of several apparatuses according to the second embodiment with different functional principles using polarized light. Light 100 emitted by illuminating device 10 is imaged by imaging devices 30 perpendicular to sheet material 40, and light 111 reflected by sheet material 40 is imaged by imaging device 30 as light 110 via imaging device 51 onto detector 50. Before light 110 impinges on detector 50 polarizer 52 is provided which transmits only those polarization components perpendicular to the polarization of light 100, as with the first to third functional principles of the invention with polarized light.

In order to permit an additional differentiation between hard-magnetic and soft-magnetic components of sheet material 40, further magnetic field producing device 33 is additionally provided for premagnetizing the hard-magnetic components of the sheet material such that they strengthen the magnetic field of magnetic field producing device 32. As magnetic field producing devices 32 or 33 one can use for example permanent magnets or current-carrying coils.

FIG. 13 shows a table for deriving magnetic properties of specularly reflecting components of sheet material 40, listing the intensities of the individual apparatuses detected by detecting device 50.

The first apparatus with imaging device 30 and quarter-wave plate 31 detects 100% of the light intensity for metallic components and 95% of the light intensity for hard-magnetic components, as described for FIG. 9. Since no external magnetic field is present, the soft-magnetic components behave like metallic components here so that detecting device 50 can detect a light intensity of 100%.

The second apparatus has only imaging device 30 so that a light intensity of 5% only from the hard-magnetic components can be detected, as described for FIG. 10. No intensity from metallically or soft-magnetically reflecting components of sheet material 40 is detected.

The third apparatus has imaging device 30 and magnetic field producing device 32 whose magnetic field is selected so as to be unable to align the hard-magnetic of the sheet material. As described for FIG. 11, a light intensity of 15% results for the metallic components of sheet material 40 by reason of the magnetic field of magnetic field producing device 32. The hard-magnetic components of the sheet material were premagnetized by magnetic field producing device 33 such that they strengthen the magnetic field of magnetic field producing device 32, as explained above, and thus increase the light intensity detected by detecting device 50 to 20% here. The soft-magnetic components of sheet material 40 are aligned in the opposite direction in the magnetic field of magnetic field producing device 32 so that they weaken the magnetic field of magnetic field producing device 32 and a light intensity of only 10% is detected here.

The magnetic properties of specularly reflecting components of sheet material 40 can be derived from the detected light intensities. Hard-magnetic components of sheet material 40 can be derived from the measurement of the second apparatus. For metallic or soft-magnetically reflecting components of sheet material 40 one can for example form the ratios of light intensity of the third apparatus to corresponding light intensities of the first apparatus. If follows from the above statements that the light intensity ratio of metallic components, here 0.15, is always greater than the light intensity ratio of soft-magnetic components of sheet material 40, here 0.1.

By suitably combining a plurality of inventive apparatuses one can thus additionally divide the magnetic properties of specularly reflecting components of sheet material 40 into metallic, hard-magnetic or soft-magnetic.

Figure 14:
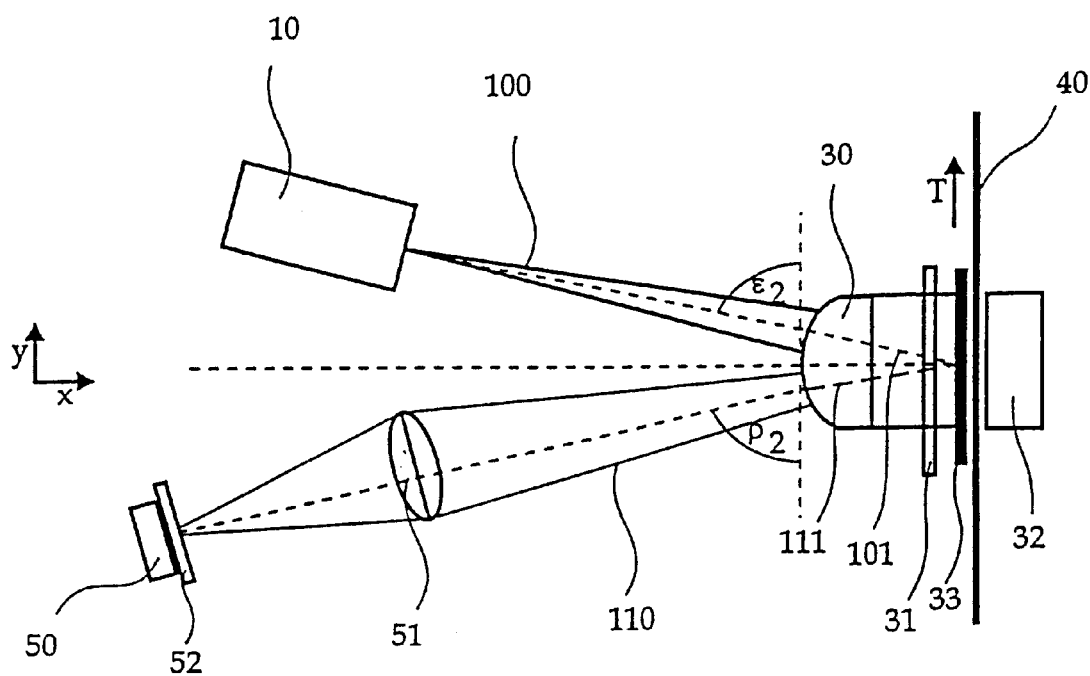
FIG. 14 shows a schematic diagram of the second embodiment having a reflector with a preferably high Kerr effect.

In the above-described embodiments sheet material 40 was disposed in line plane $E_L$. FIG. 14 shows a schematic diagram of the second embodiment wherein reflector 33 is provided in line plane $E_L$. Said reflector has along line L a specularly magnetically reflecting area, like area 43 of sheet material 40, with a preferably high Kerr effect.

Light pencil 101 is reflected by reflector 33 as reflected light pencil 111. If illuminating device 10 emits polarized light 100, the latter behaves upon reflection in the way described above for the functional principles according to FIGS. 9, 10 and 11 for area 43 of sheet material 40.

When sheet material 40 is guided past reflector 33 for detection, the magnetic components of sheet material 40 influence the Kerr effect of reflector 33, which leads to a change of the detected light intensity according to the above-described functional principles.

One can of course also modify the first, third and fourth embodiments, if required, by inserting reflector 33 at the corresponding place in the described way.

The advantage of these embodiments is that the magnetic properties of components of sheet material 40 which do not reflect specularly can also be detected here.

By suitable combinations of the above-described embodiments one can thus detect specularly reflecting components. If required, one can derive the magnetic properties of these specularly reflecting components. Further, it is possible to derive the magnetic properties of non-specularly reflecting magnetic components of sheet material 40.

An inventive apparatus can be used for example to detect security documents having specularly reflecting components with a Kerr effect. To increase the security of the security document, the document can have specularly reflecting components with different Kerr effects which can be distinguished with an inventive apparatus for example. The Kerr effect of the specularly reflecting components should preferably be relatively high in order to ensure high reliability of detection.

The components can be disposed as figures and/or codes. The latter can be for example applied to the document with a printing ink or incorporated in the document in the form of particles or a security thread.

What is claimed is:

1. An apparatus for detecting properties of sheet material by reflected light comprising:

an illuminating device arranged to illuminate a line defined along a line plane parallel to the sheet material;

a detecting device arranged to detect light reflected along said line;

a primary imaging device positioned near an immediate vicinity of said line and having a focal length wherein said illuminating device is positioned generally along a focal plane thereof; and a secondary imaging device positioned along the focal plane of said primary imaging device and disposed between said sheet material and said detecting device;

wherein said primary imaging device converts divergently emitted light from said illuminating device into a substantially parallel light pencil to illuminate said line in a first illumination plane at a predetermined angle of incidence, said first illumination plane intersecting said line plane along said line and defining a first illumination angle therewith;

wherein said primary imaging device imaging light reflected along said line in a first detection plane at a predetermined angle of reflection onto the secondary imaging device, said secondary imaging device having an aperture arranged to substantially receive those light pencils reflected along said line at said angle of reflection, said first detection plane intersecting said line plane along said line and defining a first detection angle with said line plane;

wherein the angle of incidence is equal to the angle of reflection, and the first illumination angle is equal to the first detection angle.

2. The apparatus according to claim 1 wherein the illuminating device emits light into a second illumination plane forming with the line plane a second illumination angle, said imaging device deflecting emitted light into the first illumination plane.

3. The apparatus according to claim 1 wherein light reflected along the line in the first detection plane is deflected by the imaging device into a second detection plane forming with the line plane a second detection angle.

4. The apparatus according to claim 1 wherein the first illumination angle is equal to the first detection angle and both near 90°.

5. The apparatus according to claim 4 wherein the angle of incidence is equal to the angle of reflection equaling 90°, and the illuminating device is disposed in an area near the detecting device.

6. The apparatus according to claim 1 wherein a beam splitter is provided in the beam path between the illuminating device and the detecting device.

7. The apparatus according to claim 6 wherein the beam splitter is configured as a polarizing beam splitter.

8. The apparatus according to claim 1 wherein at least one polarizer is positioned along the beam path between the illuminating device and the detecting device.

9. The apparatus according to claim 1 wherein the at least one quarter-wave plate is positioned along the beam path between the illuminating device and the detecting device.

10. The apparatus according to claim 1 wherein at least one reflector is positioned along the beam path between the illuminating device and the detecting device.

11. The apparatus according to claim 1 wherein the illuminating device emits polarized light.

12. The apparatus according to claim 1 wherein the illuminating device has at least one laser diode.

13. The apparatus according to claim 1 wherein the detecting device includes a CCD array.

14. The apparatus according to claim 1 wherein the detecting device has a photodiode array.

15. The apparatus according to claim 1 wherein said line has a length greater than the width of the sheet material.

16. The apparatus according to claim 1 wherein the sheet material is disposed along the line plane.

17. The apparatus according to claim 1 wherein a reflector is provided along said line plane.

18. The apparatus according to claim 17 wherein the reflector has a high Kerr effect.

19. An apparatus for detecting properties of sheeet material by reflected light comprising:

an illuminating device arranged to illuminate a line defined along a line plane parallel to the sheet material;

a detecting device arranged to detect light reflected along said line;

a primary imaging device positioned near an immediate vicinity of said line and having a focal lenght wherein said illuminating device is positioned generally along a focal plane thereof;

a secondary imaging device positioned along the focal plane of said primary imaging device and disposed between said sheet material and said detecting device; and a converting device positioned near an immediate vicinity of said line and generally parallel with said illuminating device, said converting device being arranged to convert divergently emitted light from said illuminating device into a substantially parallel light pencil to illuminate said line in a first illumination plane at a predetermined angle of incidence, said first illumination plane intersecting said line plane along said line and defining a first illuminating angle therewith;

wherein said primary imaging device imaging light reflected along said line in a first detection plane at a predetermined angle of reflection onto the secondary imaging device, said secondary imaging device having an aperture arranged to substantially received those light pencils reflected along said line at said angle of reflection, said first detection plane intersecting said line plane along said line and defining a first detection angle with said line plane;

wherein the angle of incidence is equal to the angle of reflection, and the first ullunination angle is equal to the first detection angle.

* * * * *